UNITED STATES PATENT OFFICE.

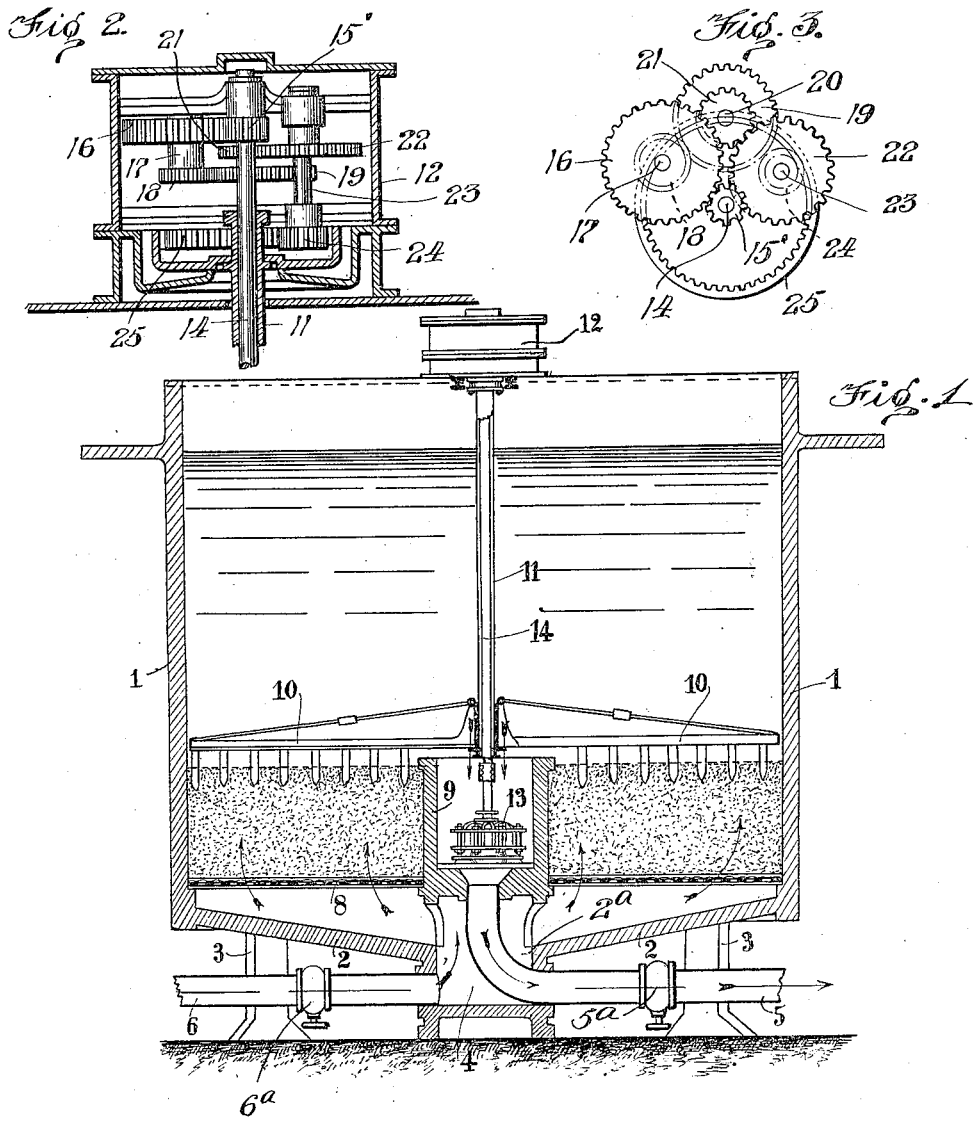

HENRY DESRUMAUX, OF PARIS, FRANCE.

FILTER.

1,318,363.   Specification of Letters Patent.   Patented Oct. 14, 1919.

Application filed July 6, 1914. Serial No. 849,181.

*To all whom it may concern:*

Be it known that I, HENRY DESRUMAUX, a subject of France, residing at Paris, #35 Rue Alphonse de Neuville, have invented certain new and useful Improvements in or Relating to Filters, of which the following is a specification, reference being had therein to the accompanying drawing.

The primary object of the present invention is to provide means for utilizing water passing through a filter, before or after the water has passed through the same as a driving means for a filter agitator, so that the kinetic energy of the liquid which has been used for washing the filtering material is utilized before it is finally passed from the filter.

The invention is especially designed and adapted for use in connection with a sand filter employed for biological purification, for the purpose of removing the gelatinous membrane which forms on the surface of the filtering bed, by agitating and disintegrating such membrane before it becomes impermeable.

Figure 1 shows in vertical section a filter constructed in accordance with my invention.

Fig. 2 is an enlarged vertical section through the reducing gear casing, and showing the reducing gearing.

Fig. 3 is a plan view of the gearing shown in Fig. 2.

Referring more in detail to the accompanying drawing, the reference numeral 1 designates a tank or receptacle, preferably of circular form and having an inclined bottom 2 tapering toward the center thereof with supporting feet 3 for the receptacle. The central portion of the inclined bottom 2 is provided with a central opening —2ᵃ— while a chamber —2ᵇ— is positioned beneath said opening, and through which chamber and opening the pipe 5 is adapted to extend and being suitably bent as is indicated and connected at its inner end to the bottom wall of the cup-shaped inner casing 9 that is arranged concentrically within the receptacle 1. The water pipe 6 communicates with the chamber —2ᵇ— and the water passing therethrough is allowed to fill the chamber —2ᵇ— and the lower end of the receptacle 1 and thence to pass upwardly through the perforated plate 8 horizontally arranged within the receptacle at a point adjacent the lower end thereof. A filtering bed of any desired material is contained within the receptacle and rests on the perforated plate 8 and is raised to a level at a point slightly spaced below the upper end of the inner casing 9. A turbine 13 of any preferred construction is horizontally mounted within the inner receptacle 9 to be positioned directly over the open upper end of the pipe 5 and the operative portion of this turbine carries the vertical shaft or spindle 14 which extends to a point adjacent the upper end of the receptacle 1 and terminates within the casing 12. Reducing gears of the desired form are positioned within the casing and communicate a rotary motion from the turbine spindle 14 to the hollow shaft or tubular member 11, which member 11 surrounds the vertical spindle 14 and extends to a point downwardly from the casing 12 to a point adjacent the upper end of the inner receptacle 9. The lower end of the hollow tubular member 11 carries any desired number of radial brackets 15 which carry agitating arms 10 preferably of the form as shown, the agitating arms including pointed elements projecting downwardly into the filtering bed as is indicated.

In the usual operation of the device, the water to be filtered is supplied to the pipe 5 and rises upwardly within the receptacle 1 to rest upon and permeate through the filtering bed above the perforated plate 8, and through the plate to the exit pipe 6. It is to be noted that the pipes 5 and 6 are provided with controlling valves 5ᵃ and 6ᵃ and that when the direction of movement of the fluid supply is reversed by manipulation of such valves, that the water will follow the course indicated by the arrows and pass from the pipe 6 upwardly through the filtering bed above the plate 8 and thence downwardly through the inner receptacle 9 to fall upon the turbine 13 and operate the same and finally out through pipe 5, the rotary motion of the turbine being communicated by the vertical spindle 14 and the reducing gears in the casing 12 to the hollow tubular member 11, and from this member to the radially positioned agitating arms 10.

As a result it will be seen that the water passing upwardly through the filtering bed will soften the gelatinous membrane which forms upon the surface thereof, and that the teeth of the rotary cleaning rake in action will break up and disintegrate this softened membrane. The particles of the membrane thus broken up or disintegrated will accordingly float upon the surface of the water in the filter casing and be thereby prevented from passing downward into and contaminating the filter bed. The water in the casing resting upon the filter bed is agitated by the action of the rake and flows over the upper edge of the central chamber 9, downwardly through said chamber and out through the pipe 5, the force of the water in flowing and striking the turbine 13 causing said turbine to be operated. The turbine transferring motion to the rake 10 through the gearing 13, as herein before described. Through the suction produced by the down flow of the water at the center of the filter casing into the central chamber 9 a suction is produced, and this suction, together with the rotary motion of the rake 10, causes the water upon the surface of the filter bed to be constantly kept in motion and to flow inwardly toward the central chamber, thereby preventing the particles of the membrane from settling on the filter bed and insuring their discharge through the outlet 5. Hence it will be seen that the cleaning mechanism will operate not only to break up or disintegrate the gelatinous membrane, but also to practically skim the same off the surface of the filter bed and discharge it, leaving the surface of the bed free and clear from any membraneous particles and preventing such contamination of the filter bed as would ensue if an attempt was made to remove the membraneous particles by forcing them downward through the filter bed.

The reducing gearing employed may be of any suitable construction. In the present instance I have shown the upper end of the shaft 14 provided with a pinion 15 meshing with a large gear 16 on a shaft 17 carrying a smaller gear 18. This gear 18 meshes with a large gear 19 on a shaft 20 on which is a smaller gear 21 meshing with a gear 22 on a shaft 23 carrying a pinion 24 meshing with an internal gear 25, which gear 25 is suitably fixed to the upper end of the shaft or sleeve 11. By the described construction of gearing motion will be transmitted from the shaft 14 operated by the turbine to the rotary rake 10, whereby proper power will be supplied to operate said rake at a desired low speed.

From the above detailed description it is thought that the operation thereof will be readily apparent and while the form of the invention herein shown and described is what is believed to be the preferred embodiment thereof, it is nevertheless to be understood that varous forms, modifications and arrangements of the parts may be made without departing from the spirit and scope of the invention as claimed.

What I claim as new is:—

A filter embodying an outer receptacle having a combined water inlet and water outlet compartment at its base, a filtration bed of sand disposed above said compartment and in communication therewith, a central chamber positioned within the outer receptacle and extending through the filter bed, said chamber having its upper end opening into the outer receptacle in proximity to the surface of the filter bed and closed against communication at its lower end with the said combined water inlet and water outlet compartment, a valved conductor communicating with the water inlet and water outlet compartment, a valved conductor communicating with the bottom of the central chamber, a turbine centrally arranged within said central chamber so as to be operated by water flowing downward therethrough, said turbine being spaced from the walls of said chamber to provide an intervening annular passage for the flow of water through said chamber to or from said second named conductor, a pair of concentric shafts extending vertically within the outer casing, one of said shafts being connected with the turbine rotor, a rotary rake carried by the other shaft and disposed within the outer receptacle and having teeth arranged to sweep over the surface of the filtration bed, and gearing connecting said shafts for transferring motion from one to the other.

In testimony whereof I affix my signature in presence of two witnesses.

HENRY DESRUMAUX.

Witnesses:
PAUL FOLLIN,
HENRI CAPELLE.